(12) United States Patent
Guo et al.

(10) Patent No.: US 9,228,847 B2
(45) Date of Patent: Jan. 5, 2016

(54) METHOD AND DEVICE FOR NAVIGATING ELECTRIC VEHICLE IN CHARGING

(71) Applicant: Tsinghua University, Beijing (CN)

(72) Inventors: Qinglai Guo, Beijing (CN); Hongbin Sun, Beijing (CN); Boming Zhang, Beijing (CN); Wenchuan Wu, Beijing (CN); Shujun Xin, Beijing (CN); Zhengshuo Li, Beijing (CN)

(73) Assignee: Tsinghua University, Beijing (CN)

( * ) Notice: Subject to any disclaimer, the term of this patent is extended or adjusted under 35 U.S.C. 154(b) by 90 days.

(21) Appl. No.: 14/109,431

(22) Filed: Dec. 17, 2013

(65) Prior Publication Data

US 2014/0172298 A1    Jun. 19, 2014

(30) Foreign Application Priority Data

Dec. 18, 2012  (CN) .......................... 2012 1 0553881

(51) Int. Cl.
*G01C 21/34* (2006.01)
*B60L 11/18* (2006.01)

(52) U.S. Cl.
CPC ......... *G01C 21/3469* (2013.01); *B60L 11/1824* (2013.01); *B60L 11/1838* (2013.01); *B60L 11/1861* (2013.01); *B60L 2240/622* (2013.01); *B60L 2240/68* (2013.01); *B60L 2240/70* (2013.01); *B60L 2240/72* (2013.01); *B60L 2240/80* (2013.01); *B60L 2260/52* (2013.01); *B60L 2260/54* (2013.01)

(58) Field of Classification Search
CPC ............ G01C 21/3469; B60L 11/1838; B60L 2260/54; B60L 2240/72
See application file for complete search history.

(56) References Cited

U.S. PATENT DOCUMENTS

| 5,220,263 | A  | * | 6/1993 | Onishi et al. ................. 318/587 |
| 5,790,976 | A  | * | 8/1998 | Boll et al. .................. 455/456.5 |
| 2011/0224900 | A1 | * | 9/2011 | Hiruta et al. ................ 701/201 |
| 2012/0109519 | A1 | * | 5/2012 | Uyeki ......................... 701/439 |
| 2013/0090936 | A1 | * | 4/2013 | Solomon et al. ............... 705/1.1 |
| 2013/0261953 | A1 | * | 10/2013 | Kiyama et al. ............... 701/400 |

* cited by examiner

*Primary Examiner* — Michael J Zanelli
(74) *Attorney, Agent, or Firm* — David D. Brush; Westman Champlin & Koehler, P.A.

(57) ABSTRACT

A method and a device for navigating an electric vehicle in charging are provided. The method comprises: S1, obtaining a navigation area, wherein the navigation area comprises a plurality of charging stations; S2, receiving a charging request from an electric vehicle in the navigation area; S3, obtaining a plurality of first time periods according to the electric vehicle and the plurality of charging stations; S4, selecting a minimum first time period from the plurality of first time periods; and S5, navigating the electric vehicle to a charging station corresponding to the minimum first time period.

13 Claims, 5 Drawing Sheets

METHOD AND DEVICE FOR NAVIGATING ELECTRIC VEHICLE IN CHARGING

CROSS-REFERENCE TO RELATED APPLICATION

This application claims priority to and benefits of Chinese Patent Application Serial No. 201210553881.0, filed with the State Intellectual Property Office of P. R. China on Dec. 18, 2012, the entire content of which is incorporated herein by reference.

FIELD

The present disclosure relates to a power system operation and control field, and more particularly to a method for navigating an electric vehicle in charging and a device for navigating an electric vehicle in charging.

BACKGROUND

The international standard SAE J1772-2010 provides three methods for charging the electric vehicle: the AC Level 1 charging for slow charging, the AC Level 2 charging and the DC charging for fast charging. The slow charging mainly relies on the charging post and takes more than six hours, so that it is suitable for the electric vehicle which is parked for a long time in the same parking lot. The fast charging is mainly done in the charging station and takes 15 minutes to 2 hours, so that it is suitable for emergency charging of the electric vehicle and daily charging of public vehicles and taxis and at this time the charging power of the electric vehicle is the maximum charging power.

However, there are some problems: the charging for the electric vehicle influences the power grid adversely, such as overload and power loss. Meanwhile, if numerous electric vehicles arrive at one charging station for charging, the electric vehicles in the one charging station will wait for a long time, but there is no electric vehicle waiting for charging in other charging stations.

SUMMARY

Embodiments of the present disclosure seek to solve at least one of the problems existing in the related art to at least some extent.

One objective of the present disclosure is to provide a method for navigating an electric vehicle in charging, which provides the navigation route which consumes minimum time to the user of the electric vehicle.

Another objective of the present disclosure is to provide a device for navigating an electric vehicle in charging.

Yet another objective of the present disclosure is to provide a computer readable storage medium.

According to a first aspect of the present disclosure, a method for navigating an electric vehicle in charging is provided. The method comprises steps of: S1, obtaining a navigation area, wherein the navigation area comprises a plurality of charging stations; S2, receiving a charging request from an electric vehicle in the navigation area; S3, obtaining a plurality of first time periods according to the electric vehicle and the plurality of charging stations; S4, selecting a minimum first time period from the plurality of first time periods; and S5, navigating the electric vehicle to a charging station corresponding to the minimum first time period.

In some embodiments, after step S1 the method further comprises: obtaining a plurality of intersections in the navigation area; marking the plurality of intersections and the plurality of charging stations in the navigation area as a plurality of nodes in the navigation area; and obtaining a node connection matrix N according to the plurality of nodes, wherein $$N = \begin{pmatrix} N_{11} & \cdots & N_{1n} \\ \cdots & N_{wz} & \cdots \\ N_{n1} & \cdots & N_{nn} \end{pmatrix},$$

where n represents a number of the plurality of nodes, and $$N_{wz} = \begin{cases} 2 & \text{when node } w \text{ is identical with node } z \\ 1 & \text{when there are other nodes between node } w \text{ and node } z. \\ 0 & \text{when node } w \text{ is directly connected to node } z \end{cases}$$

In some embodiments, step S3 comprises: S31, obtaining a second time period which the electric vehicle spends on arriving to each charging station; S32, obtaining a third time period which the electric vehicle spends on waiting for charging in each charging station; S33, obtaining a fourth time period which the electric vehicle spends on being charged in each charging station; and S34, obtaining each first time period according to a sum of the second time period, the third time period and the fourth time period.

In some embodiments, step S31 comprises: obtaining a first node which the electric vehicle currently passes, a second node which the electric vehicle will arrive to, and a distance from the electric vehicle to the second node; obtaining a path set from the second node to each charging station according to the node connection matrix, wherein each path in the path set passes each node at most once; obtaining the second time period according to formula (1), $$t_d^\lambda = \min_{1 \leq j \leq m_{c2,\lambda}} \left( \sum_{\eta=1}^{n_{c2,\lambda}^j - 1} \frac{S_{w_{c2,\lambda}^{j,\eta} w_{c2,\lambda}^{j,\eta+1}}}{V_{w_{c2,\lambda}^{j,\eta} w_{c2,\lambda}^{j,\eta+1}}} \right) + \frac{L}{V_{c1c2}} \quad (1)$$

where $t_d^\lambda$ represents the second time period, $\lambda$ represents a charging station, c1 represents the first node, c2 represents the second node, L represents the distance from the electric vehicle to the second node, $m_{c2,\lambda}$ represents a number of the paths in the path set, $n_{c2,\lambda}^j$ represents a number of the nodes passed by a $j^{th}$ path, $w_{c2,\lambda}^{j,\eta}$ represents an $\eta^{th}$ node passed by the $j^{th}$ path, $w_{c2,\lambda}^{j,\eta+1}$ represents an $\eta+1^{th}$ node passed by the $j^{th}$ path, $$S_{w_{c2,\lambda}^{j,\eta} w_{c2,\lambda}^{j,\eta+1}}$$

represents a distance from the node $w_{c2,\lambda}^{j,\eta}$ to the node $w_{c2,\lambda}^{j,\eta+1}$, $$V_{w_{c2,\lambda}^{j,\eta} w_{c2,\lambda}^{j,\eta+1}}$$

represents a first average traffic speed from the node $w_{c2,\lambda}^{j,\eta}$ to the node $w_{c2,\lambda}^{j,\eta+1}$, and $V_{c1c2}$ represents a second average traffic speed from the first node to the second node.

In some embodiments, step S32 comprises: obtaining a time T1 when receiving the charging request from the electric vehicle; at a time $T1+t_d^j$, judging whether a number of electric vehicles in each charging station is less than a number of charging posts in each charging station; if yes, the third time period is 0; and if no, obtaining the third time period according to formula (2), $$t_{wait}^\lambda = \max\left(0, T_{k_{T1+t_d^\lambda}^\lambda - m_c^{T1+t_d^\lambda}+1}^{T1+t_d^\lambda} - (T_1 + t_d^\lambda)\right) \quad (2)$$

where $t_{wait}^\lambda$ represents the third time period, c represents the plurality of charging posts, $$k_{T1+t_d^\lambda}^\lambda$$

represents a number of electric vehicles in a charging station $\lambda$ at the time $T_1+t_d^\lambda$, $$m_c^{T1+t_d^\lambda}$$

represents a number of charging posts in the charging station $\lambda$, and $$T_{k_{T1+t_d^\lambda}^\lambda - m_c^{T1+t_d^\lambda}+1}^{T1+t_d^\lambda}$$

represents a charging finish time of an electric vehicle $$k_{T1+t_d^\lambda}^\lambda - m_c^{T1+t_d^\lambda} + 1.$$

In some embodiments, the method further comprises: obtaining a maximum available charging capacity of a power grid; and obtaining the number of the charging posts in each charging station according to the maximum available charging capacity.

In some embodiments, step S33 comprises: obtaining a current electrical energy and a consumption of electrical energy per unit distance of the electric vehicle; obtaining a remaining electrical energy of the electric vehicle according to formula (3), $$E'_{SOC} = E_{SOC} - E_{ave} \cdot \left(\sum_{\eta=1}^{n_{c2,\lambda}^j - 1} S_{w_{c2,\lambda}^{j,\eta} w_{c2,\lambda}^{j,\eta+1}} + L\right) \quad (3)$$

where $E'_{soc}$ represents the remaining electrical energy of the electric vehicle, $E_{soc}$ represents the current electrical energy of the electric vehicle, and $E_{ave}$ represents the consumption of electrical energy per unit distance of the electric vehicle;

obtaining the fourth time period according to formula (4), $$t_c^\lambda = \frac{E_{full} - E'_{SOC}}{P_c^\lambda} \quad (4)$$

where $E_{full}$ represents a battery capacity of the electric vehicle, and $P_c^\lambda$ represents a charging power of each charging post in the charging station $\lambda$.

With the method for navigating the electric vehicle in charging according to an embodiment of the present disclosure, the charging power of the charging station is maximized while ensuring the safe and stable operation of the power grid; and the navigation route which consumes minimum time is provided to the user of the electric vehicle to shorten the total time for charging the electric vehicle.

According to a second aspect of the present disclosure, a device for measuring a performance of a wireless terminal is provided. The device comprises: a first obtaining module, configured to obtain a navigation area, wherein the navigation area comprises a plurality of charging stations; a receiving module, configured to receive a charging request from an electric vehicle in the navigation area; a second obtaining module, configured to obtain a plurality of first time periods according to the electric vehicle and the plurality of charging stations; a selecting module, configured to select a minimum first time period from the plurality of first time periods; and a navigating module, configured to navigate the electric vehicle to a charging station corresponding to the minimum first time period.

In some embodiments, the device further comprises: a third obtaining module, configured to obtain a plurality of intersections in the navigation area; a marking module, configured to mark the plurality of intersections and the plurality of charging stations in the navigation area as a plurality of nodes in the navigation area; and a fourth obtaining module, configured to obtain a node connection matrix N according to the plurality of nodes, wherein $$N = \begin{pmatrix} N_{11} & \cdots & N_{1n} \\ \cdots & N_{wz} & \cdots \\ N_{n1} & \cdots & N_{nn} \end{pmatrix},$$

where n represents a number of the plurality of nodes, and $$N_{wz} = \begin{cases} 2 & \text{when node } w \text{ is identical with node } z \\ 1 & \text{when there are other nodes between node } w \text{ and node } z \\ 0 & \text{when node } w \text{ is directly connected to node } z \end{cases}.$$

In some embodiments, the second obtaining module comprises: a first obtaining unit, configured to obtain a second time period which the electric vehicle spends on arriving to each charging station; a second obtaining unit, configured to obtain a third time period which the electric vehicle spends on waiting for charging in each charging station; a third obtaining unit, configured to obtain a fourth time period which the electric vehicle spends on being charged in each charging station; and a fourth obtaining unit, configured to each first time period according to a sum of the second time period, the third time period and the fourth time period.

In some embodiments, the first obtaining unit is further configured to: obtain a first node which the electric vehicle currently passes, a second node which the electric vehicle will arrive to, and a distance from the electric vehicle to the second node; obtain a path set from the second node to each charging station according to the node connection matrix, wherein each path in the path set passes each node at most once; obtain the second time period according to formula (1), $$t_d^\lambda = \min_{1 \le j \le m_{c2,\lambda}} \left( \sum_{\eta=1}^{n_{c2,\lambda}^j - 1} \frac{S_{w_{c2,\lambda}^{j,\eta} w_{c2,\lambda}^{j,\eta+1}}}{V_{w_{c2,\lambda}^{j,\eta} w_{c2,\lambda}^{j,\eta+1}}} \right) + \frac{L}{V_{c1c2}} \quad (1)$$

where $t_d^\lambda$ represents the second time period, $\lambda$ represents a charging station, c1 represents the first node, c2 represents the second node, L represents the distance from the electric vehicle to the second node, $m_{c2,\lambda}$ represents a number of the paths in the path set, $n_{c2,\lambda}^j$ represents a number of the nodes passed by a $j^{th}$ path, $w_{c2,\lambda}^{j,\eta}$ represents an $\eta^{th}$ node passed by the $j^{th}$ path, $w_{c2,\lambda}^{j,\eta+1}$ represents an $\eta+1^{th}$ node passed by the $j^{th}$ path, $$S_{w_{c2,\lambda}^{j,\eta} w_{c2,\lambda}^{j,\eta+1}}$$

represents a distance from the node $w_{c2,\lambda}^{j,\eta}$ to the node $w_{c2,\lambda}^{j,\eta+1}$, $$V_{w_{c2,\lambda}^{j,\eta} w_{c2,\lambda}^{j,\eta+1}}$$

represents a first average traffic speed from node the $w_{c2,\lambda}^{j,\eta}$ to the node $w_{c2,\lambda}^{j,\eta+1}$ and $V_{c1c2}$ represents a second average traffic speed from the first node to the second node.

In some embodiments, the second obtaining unit is further configured to: obtain a time T1 when receiving the charging request from the electric vehicle; at a time $T1+t_d^\lambda$, judge whether a number of electric vehicles in each charging station is less than a number of charging posts in each charging station; if yes, the third time period is 0; and if no, obtain the third time period according to formula (2), $$t_{wait}^\lambda = \max\left(0, T_{k_{T1+t_d^\lambda}^\lambda - m_c^{T1+t_d^\lambda}+1}^{T1+t_d^\lambda} - (T_1 + t_d^\lambda)\right) \quad (2)$$

where $t_{wait}^\lambda$ represents the third time period, c represents the plurality of charging posts, $$k_{T1+t_d^\lambda}^\lambda$$

represents a number of electric vehicles in a charging station $\lambda$ at the $T_1+t_d^\lambda$, $$m_c^{T1+t_d^\lambda}$$

represents a number of charging posts in the charging station $\lambda$, and $$T_{k_{T1+t_d^\lambda}^\lambda - m_c^{T1+t_d^\lambda}+1}^{T1+t_d^\lambda}$$

represents a charging finish time of an electric vehicle $$k_{T1+t_d^\lambda}^\lambda - m_c^{T1+t_d^\lambda}+1.$$

In some embodiments, the second obtaining module further comprises: a fifth obtaining unit, configured to obtain a maximum available charging capacity of a power grid; and a sixth obtaining unit, configured to obtain the number of the charging posts in each charging station according to the maximum available charging capacity.

In some embodiments, the third obtaining unit is further configured to: obtain a current electrical energy and a consumption of electrical energy per unit distance of the electric vehicle; obtain a remaining electrical energy of the electric vehicle according to formula (3), $$E'_{SOC} = E_{SOC} - E_{ave} \cdot \left( \sum_{\eta=1}^{n_{c2,\lambda}^j - 1} S_{w_{c2,\lambda}^{j,\eta} w_{c2,\lambda}^{j,\eta+1}} + L \right) \quad (3)$$

where $E'_{soc}$ represents the remaining electrical energy of the electric vehicle, $E_{soc}$ represents the current electrical energy of the electric vehicle, and $E_{ave}$ represents the consumption of electrical energy per unit distance of the electric vehicle;

obtain the fourth time period according to formula (4), $$t_c^\lambda = \frac{E_{full} - E'_{SOC}}{P_c^\lambda} \quad (4)$$

where $E_{full}$ represents a battery capacity of the electric vehicle, and $P_c^\lambda$ represents a charging power of each charging post in the charging station $\lambda$.

With the device for navigating the electric vehicle in charging according to an embodiment of the present disclosure, the charging power of the charging station is maximized while ensuring the safe and stable operation of the power grid; and the navigation route which consumes minimum time is provided to the user of the electric vehicle to shorten the total time for charging the electric vehicle.

According to a third aspect of the present disclosure, a computer readable storage medium is provided. The computer readable storage medium comprises a computer program for executing the method for measuring the performance of the wireless terminal according to the first aspect of the present disclosure when running on a computer.

The above summary of the present disclosure is not intended to describe each disclosed embodiment or every implementation of the present disclosure. The Figures and the detailed descriptions which follow more particularly exemplify illustrative embodiments.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
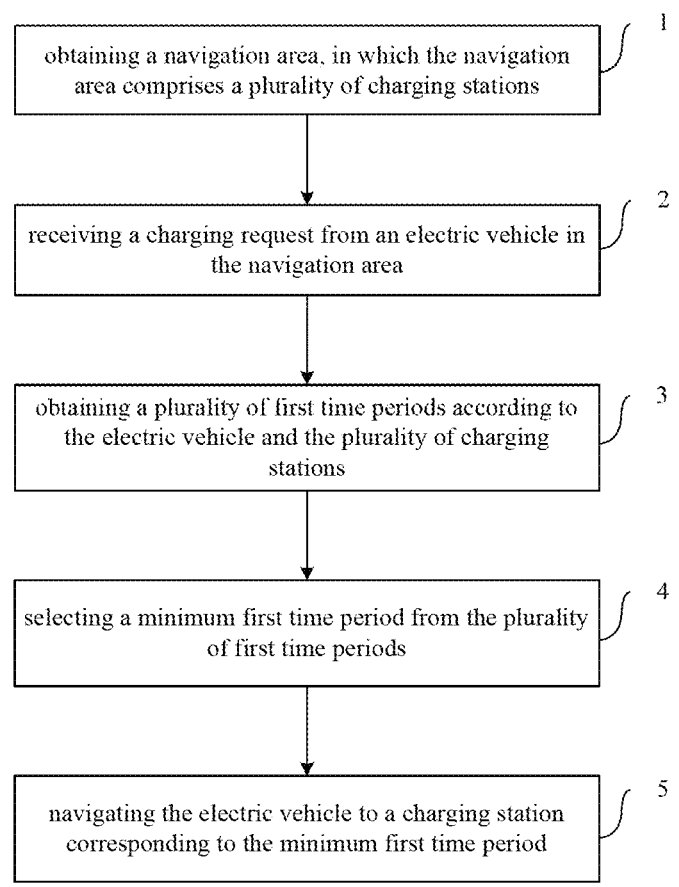
FIG. 1 is a flow chart of a method for navigating an electric vehicle in charging according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, unless specified otherwise.

In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

In the description of the present disclosure, a structure in which a first feature is "on" a second feature may include an embodiment in which the first feature directly contacts the second feature, and may also include an embodiment in which an additional feature is formed between the first feature and the second feature so that the first feature does not directly contact the second feature, unless specified otherwise. Furthermore, a first feature "on," "above," or "on top of" a second feature may include an embodiment in which the first feature is right "on," "above," or "on top of" the second feature, and may also include an embodiment in which the first feature is not right "on," "above," or "on top of" the second feature, or just means that the first feature is at a height higher than that of the second feature. While a first feature "beneath," "below," or "on bottom of" a second feature may include an embodiment in which the first feature is right "beneath," "below," or "on bottom of" the second feature, and may also include an embodiment in which the first feature is not right "beneath," "below," or "on bottom of" the second feature, or just means that the first feature is at a height lower than that of the second feature.

In the following, a method and a device for navigating an electric vehicle in charging according to embodiments of the present disclosure will be described in detail with reference to the drawings.

Figure 2:
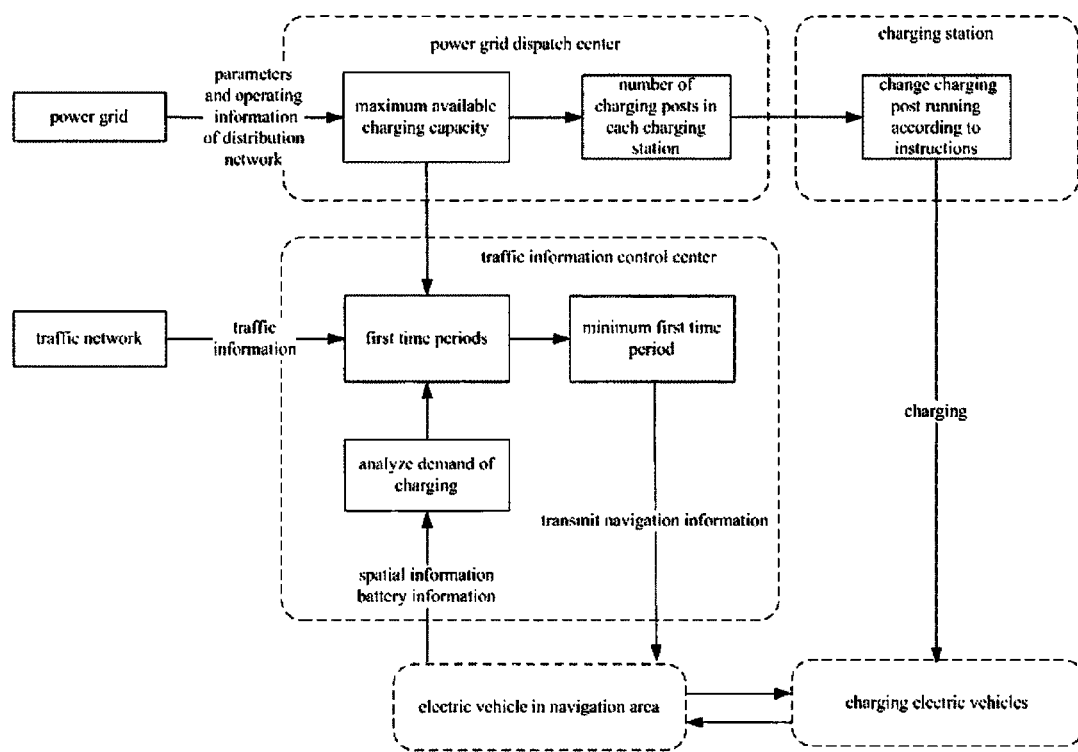
FIG. 2 is a schematic diagram of a method for navigating an electric vehicle in charging according to an embodiment of the present disclosure.

FIG. 1 is a flow chart of a method for navigating an electric vehicle in charging according to an embodiment of the present disclosure. FIG. 2 is a schematic diagram of a method for navigating an electric vehicle in charging according to an embodiment of the present disclosure.

As shown in FIG. 1, the method comprises the following steps.

In step 1, a navigation area is obtained, wherein the navigation area comprises a plurality of charging stations.

In one embodiment, after step 1, the method further comprises step 10 (not shown in FIG. 1). In step 10, firstly, a plurality of intersections in the navigation area are obtained; secondly, the plurality of intersections and the plurality of charging stations in the navigation area are marked as a plurality of nodes in the navigation area; and then a node connection matrix N is obtained according to the plurality of nodes, in which $$N = \begin{pmatrix} N_{11} & \ldots & N_{1n} \\ \ldots & N_{wz} & \ldots \\ N_{n1} & \ldots & N_{nn} \end{pmatrix},$$

where n represents a number of the plurality of nodes, and $$N_{wz} = \begin{cases} 2 & \text{when node } w \text{ is identical with node } z \\ 1 & \text{when there are other nodes between node } w \text{ and node } z \\ 0 & \text{when node } w \text{ is directly connected to node } z \end{cases}.$$

Specifically, as shown in FIG. 2, the traffic information control center firstly obtains the traffic information from the traffic network, secondly, selects the navigation area according to the traffic information, and then numbers the plurality of intersections and the plurality of charging stations in the navigation area as the plurality of nodes in the navigation area. The beginning spot and the ending spot of the road in the navigation area are defined as the intersections. The charging station in the road is also defined as the intersections. All of the intersections are marked as nodes. If there is no other node between two nodes, the two nodes are connected by one line. All of the nodes and the lines form a new simplified traffic network.

Figure 3A:
FIG. 3(a) is a schematic diagram of a traffic network according to an embodiment of the present disclosure.
Figure 3B:
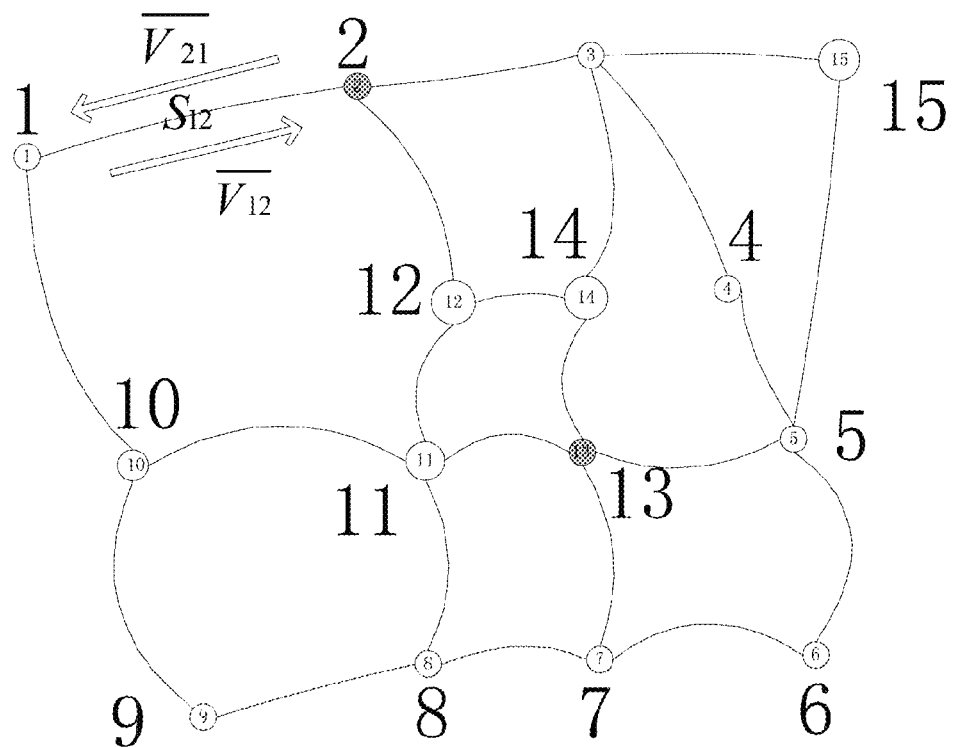
FIG. 3(b) is a schematic diagram of a new simplified traffic network according to an embodiment of the present disclosure.

FIG. 3(a) is a schematic diagram of a traffic network according to an embodiment of the present disclosure. FIG. 3(b) is a schematic diagram of a new simplified traffic network according to an embodiment of the present disclosure. As shown in FIG. 3(b), the gray dots represent the charging stations, the white dots represent the intersections, $S_{ef}$ represents the distance from a node e to a node f, $\nabla_{ef}$ represents the average traffic speed from the node e to the node f, and $\overline{V}_{fe}$ represents the average traffic speed from the node f to the node e.

In step 2, a charging request from an electric vehicle in the navigation area is received.

In one embodiment, as shown in FIG. 2, the traffic information control center receives the charging request from the electric vehicle in the navigation area in real-time.

In step 3, a plurality of first time periods according to the electric vehicle and the plurality of charging stations.

Specifically, the first time period is a time period which the electric vehicle spends on arriving to the plurality of charging stations, waiting for charging and being charged.

Figure 4:
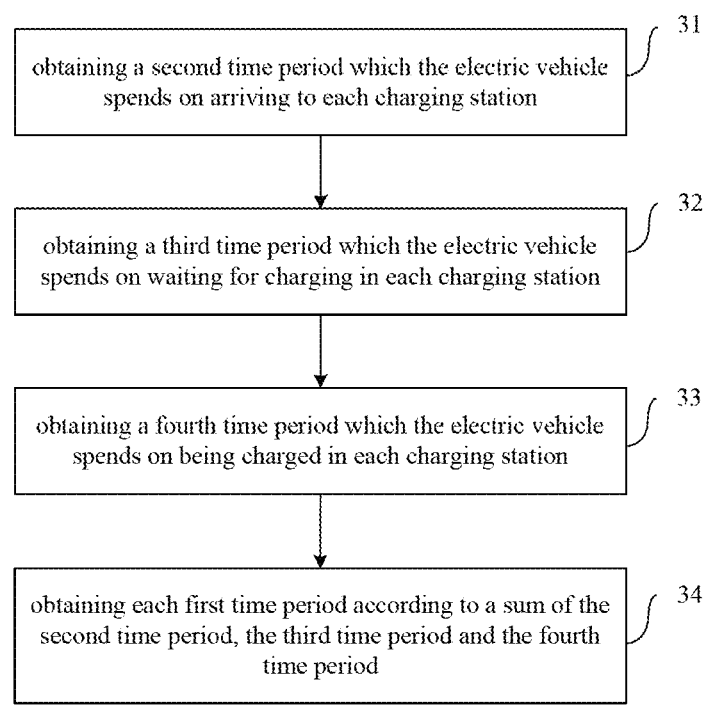
FIG. 4 is a flow chart of step 3 according to an embodiment of the present disclosure.

FIG. 4 is a flow chart of step 3 according to an embodiment of the present disclosure.

In one embodiment, as shown in FIG. 4, step 3 comprises the following steps.

In step 31, a second time period which the electric vehicle spends on arriving to each charging station is obtained.

In step 32, a third time period which the electric vehicle spends on waiting for charging in each charging station is obtained.

In step 33, a fourth time period which the electric vehicle spends on being charged in each charging station is obtained.

In step 34, each first time period is obtained according to a sum of the second time period, the third time period and the fourth time period.

In one embodiment, step 31 comprises: firstly, a first node which the electric vehicle currently passes, a second node which the electric vehicle will arrive to, and a distance from the electric vehicle to the second node are obtained; secondly, a path set from the second node to each charging station is obtained according to the node connection matrix, wherein each path in the path set passes each node at most once; and then the second time period is obtained according to formula (1), $$t_d^\lambda = \min_{1 \le j \le m_{c2,\lambda}} \left( \sum_{\eta=1}^{n_{c2,\lambda}^j - 1} \frac{S_{w_{c2,\lambda}^{j,\eta} w_{c2,\lambda}^{j,\eta+1}}}{\overline{V}_{w_{c2,\lambda}^{j,\eta} w_{c2,\lambda}^{j,\eta+1}}} \right) + \frac{L}{\overline{V}_{c1c2}} \quad (1)$$

where $t_d^\lambda$ represents the second time period, $\lambda$ represents an charging station, c1 represents the first node, c2 represents the second node, L represents the distance from the electric vehicle to the second node, $m_{c2,\lambda}$ represents a number of the paths in the path set, $n_{c2,\lambda}^j$ represents a number of the nodes passed by a $j^{th}$ path, $w_{c2,\lambda}^{j,\eta}$ represents an $\eta^{th}$ node passed by the $j^{th}$ path, $w_{c2,\lambda}^{j,\eta+1}$ represents an $\eta+1^{th}$ node passed by the $j^{th}$ path, $$S_{w_{c2,\lambda}^{j,\eta} w_{c2,\lambda}^{j,\eta+1}}$$

represents a distance from the node $w_{c2,\lambda}^{j,\eta}$ to the node $w_{c2,\lambda}^{j,\eta+1}$, $$\overline{V}_{w_{c2,\lambda}^{j,\eta} w_{c2,\lambda}^{j,\eta+1}}$$

represents a first average traffic speed from the node $w_{c2,\lambda}^{j,\eta}$ to the node $w_{c2,\lambda}^{j,\eta+1}$, and $\overline{V}_{c1c2}$ represents a second average traffic speed from the first node to the second node.

Specifically, the traffic information control center can monitor each electric vehicle in the navigation area to obtain the spatial information, such as the first node, the second node and the distance from the electric vehicle to the second node.

In one embodiment, step 32 comprises: firstly, a time T1 when receiving the charging request from the electric vehicle is obtained; secondly, whether a number of electric vehicles in each charging station is less than a number of charging posts in each charging station is judged at a time $T1+t_d^\lambda$; if yes, the third time period is 0; if no, the third time period is obtained according to formula (2), $$t_{wait}^\lambda = \max\left(0, T_{k_{T_1+t_d^\lambda}^\lambda - m_c^{T_1+t_d^\lambda}+1}^{T_1+t_d^\lambda} - (T_1 + t_d^\lambda)\right) \quad (2)$$

where $t_{wait}^\lambda$ represents the third time period, c represents the plurality of charging posts, $$k_{T_1+t_d^\lambda}^\lambda$$

represents a number of electric vehicles in a charging station $\lambda$ at the time $T_1+t_d^\lambda$, $$m_c^{T_1+t_d^\lambda}$$

represents a number of charging posts in the charging station $\lambda$, and $$T_{k_{T_1+t_d^\lambda}^\lambda - m_c^{T_1+t_d^\lambda}+1}^{T_1+t_d^\lambda}$$

represents a charging finish time of an electric vehicle $$k_{T_1+t_d^\lambda}^\lambda - m_c^{T_1+t_d^\lambda} + 1.$$

Specifically, the traffic information control center obtains the plurality of charging finish times of all of electric vehicles in the charging station (all of electric vehicles comprises the electric vehicles waiting for charging and the electric vehicles being charged), and then sequences the plurality of charging finish times in chronological order, which are $$T_1^{T_1+t_d^\lambda} \ldots T_{k_{T_1+t_d^\lambda}^\lambda}^{T_1+t_d^\lambda}.$$

If there are $$k_{T_1+t_d^\lambda}^\lambda$$

electric vehicles being charged, the electric vehicle finishes waiting after the charging of the electric vehicle $$k^{\lambda}_{T1+r^{\lambda}_d} - m_c^{T1+r^{\lambda}_d} + 1$$

has been finished.

In one embodiment, the method comprises following steps: a maximum available charging capacity of a power grid is obtained; and the number of the charging posts in each charging station is obtained according to the maximum available charging capacity.

Specifically, the power grid dispatch center obtains parameters and operating information of the distribution network in the power grid, such as the load forecasting value of each node in the distribution network. The power grid dispatch center then obtains the maximum available charging capacity to ensure that the power of the transmission line of the distribution network is less than the power rating and the voltage of each node of the distribution network is in the voltage ranges.

In one embodiment, step 33 comprises: firstly, a current electrical energy and a consumption of electrical energy per unit distance of the electric vehicle are obtained; secondly, a remaining electrical energy of the electric vehicle is obtained according to formula (3), $$E'_{SOC} = E_{SOC} - E_{ave} \cdot \left( \sum_{\eta=1}^{n^j_{c2,\lambda}-1} S_{w^{j,\eta}_{c2,\lambda} w^{j,\eta+1}_{c2,\lambda}} + L \right) \quad (3)$$

where $E'_{soc}$ represents the remaining electrical energy of the electric vehicle, $E_{soc}$ represents the current electrical energy of the electric vehicle, and $E_{ave}$ represents the consumption of electrical energy per unit distance of the electric vehicle; and then the fourth time period is obtained according to formula (4), $$r^{\lambda}_c = \frac{E_{full} - E'_{SOC}}{P^{\lambda}_c} \quad (4)$$

where $E_{full}$ represents a battery capacity of the electric vehicle, and $P_c^{\lambda}$ represents a charging power of each charging post in the charging station.

Specifically, the remaining electrical energy, the current electrical energy, the consumption of electrical energy per unit distance and the battery capacity are the battery information of the electric vehicle.

In step 4, a minimum first time period is selected from the plurality of first time periods.

In step 5, the electric vehicle is navigated to a charging station corresponding to the minimum first time period.

With the method for navigating the electric vehicle in charging according to an embodiment of the present disclosure, the charging power of the charging station is maximized while ensuring the safe and stable operation of the power grid; and the navigation route which consumes minimum time is provided to the user of the electric vehicle to shorten the total time for charging the electric vehicle.

The present disclosure also provides a device for navigating an electric vehicle in charging.

Figure 5:
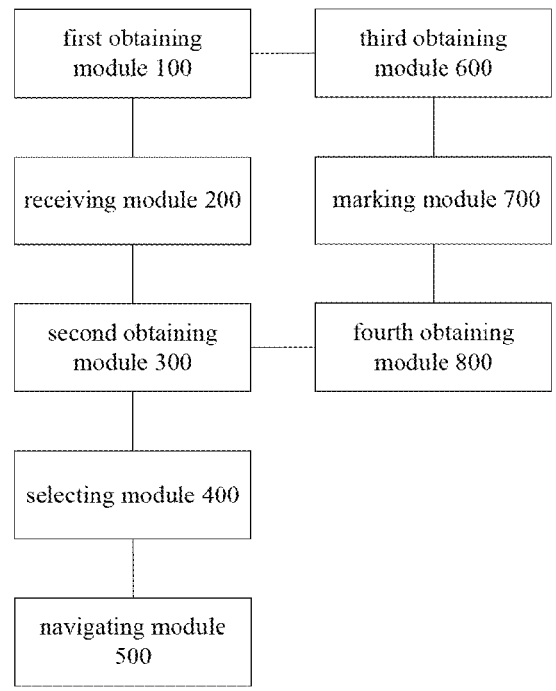
FIG. 5 is a block diagram of a device for navigating an electric vehicle in charging according to an embodiment of the present disclosure.

FIG. 5 is a block diagram of a device for navigating an electric vehicle in charging according to an embodiment of the present disclosure.

As show in FIG. 5, the device comprises a first obtaining module 100, a receiving module 200, a second obtaining module 300, a selecting module 400, a navigating module 500, a third obtaining module 600, a marking module 700, and a fourth obtaining module 800.

Specifically, the first obtaining module 100 is configured to obtain a navigation area, wherein the navigation area comprises a plurality of charging stations.

In one embodiment, the third obtaining module 600 is configured to obtain a plurality of intersections in the navigation area. The marking module 700 is configured to number the plurality of intersections and the plurality of charging stations in the navigation area as a plurality of nodes in the navigation area. The fourth obtaining module 800 is configured to obtain a node connection matrix N according to the plurality of nodes, wherein $$N = \begin{pmatrix} N_{11} & \cdots & N_{1n} \\ \cdots & N_{wz} & \cdots \\ N_{n1} & \cdots & N_{nn} \end{pmatrix},$$

where n represents a number of the plurality of nodes, and $$N_{wz} = \begin{cases} 2 & \text{when node } w \text{ is identical with node } z \\ 1 & \text{when there are other nodes between node } w \text{ and node } z \\ 0 & \text{when node } w \text{ is directly connected to node } z \end{cases}$$

Specifically, the beginning spot and the ending spot of the road in the navigation area are defined as the intersections. The charging station in the road is also defined as the intersections. All of the intersections are marked as nodes by the marking module 700. If there is no other node between two nodes, the two nodes are connected by one line. All of the nodes and the lines form a new simplified traffic network. As shown in FIG. 3(b), the gray dots represent the charging stations, the white dots represent the intersections, $S_{ef}$ represents the distance from a node e to a node f, $V_{ef}$ represents the average traffic speed from the node e to the node f, and $V_{fe}$ represents the average traffic speed from the node f to the node e.

The receiving module 200 is configured to receive a charging request from an electric vehicle in the navigation area. In one embodiment, the receiving module 200 receives the charging request from the electric vehicle in the navigation area in real-time.

The second obtaining module 300 is configured to obtain a plurality of first time periods according to the electric vehicle and the plurality of charging stations.

Specifically, the first time period is a time period which the electric vehicle spends on arriving to the plurality of charging stations, waiting for charging and being charged.

Figure 6:
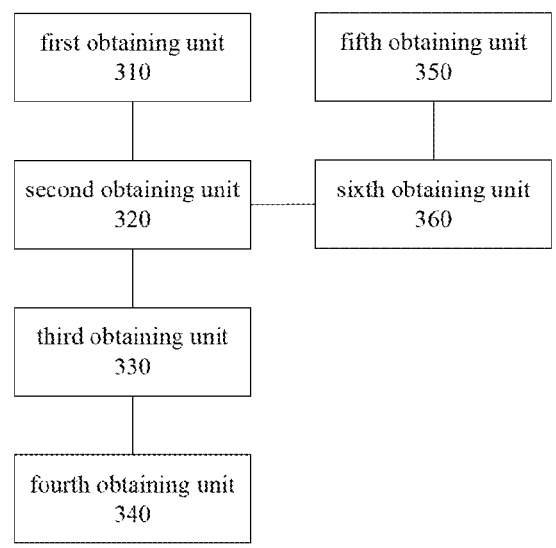
FIG. 6 is a block diagram of a second obtaining module according to an embodiment of the present disclosure.

FIG. 6 is a flow chart of the second obtaining module according to an embodiment of the present disclosure.

In one embodiment, as shown in FIG. 6, the second obtaining module 300 comprises a first obtaining unit 310, a second obtaining unit 320, a third obtaining unit 330, a fourth obtaining unit 340, a fifth obtaining unit 350 and a sixth obtaining unit 360.

Specifically, the first obtaining unit 310 is configured to obtain a second time period which the electric vehicle spends on arriving to each charging station. The second obtaining unit 320 is configured to obtain a third time period which the electric vehicle spends on waiting for charging in each charging station. The third obtaining unit 330 is configured to obtain a fourth time period which the electric vehicle spends on being charged in each charging station. The fourth obtaining unit 340 is configured to each first time period according to a sum of the second time period, the third time period and the fourth time period.

In one embodiment, the first obtaining unit 310 is further configured to: obtain a first node which the electric vehicle currently passes, a second node which the electric vehicle will arrive to, and a distance from the electric vehicle to the second node; obtain a path set from the second node to each charging station according to the node connection matrix, wherein each path in the path set passes each node at most once; obtain the second time period of the electric vehicle according to formula (1), $$t_d^\lambda = \min_{1 \le j \le m_{c2,\lambda}} \left( \sum_{\eta=1}^{n_{c2,\lambda}^j - 1} \frac{S_{w_{c2,\lambda}^{j,\eta} w_{c2,\lambda}^{j,\eta+1}}}{\overline{V}_{w_{c2,\lambda}^{j,\eta} w_{c2,\lambda}^{j,\eta+1}}} \right) + \frac{L}{\overline{V}_{c1c2}} \quad (1)$$

where $t_d^\lambda$ represents the second time period, $\lambda$ represents an charging station, c1 represents the first node, c2 represents the second node, L represents the distance from the electric vehicle to the second node, $m_{c2,\lambda}$ represents a number of the paths in the path set, $n_{c2,\lambda}^j$ represents a number of the nodes passed by a $j^{th}$ path, $w_{c2,\lambda}^{j,\eta}$ represents an $\eta^{th}$ node passed by the $j^{th}$ path, represents an $\eta+1^{th}$ j node passed by the $j^{th}$ path, $$S_{w_{c2,\lambda}^{j,\eta} w_{c2,\lambda}^{j,\eta+1}}$$

represents a distance from the node $w_{c2,\lambda}^{j,\eta}$ to the node $w_{c2,\lambda}^{j,\eta+1}$, $$\overline{V}_{w_{c2,\lambda}^{j,\eta} w_{c2,\lambda}^{j,\eta+1}}$$

represents a first average traffic speed from the node $w_{c2,\lambda}^{j,\eta}$ to the node $w_{c2,\lambda}^{j,\eta+1}$, and $\overline{V}_{c1c2}$ represents a second average traffic speed from the first node to the second node.

Specifically, the first obtaining unit 310 can monitor each electric vehicle in the navigation area to obtain the spatial information, such as the first node, the second node and the distance from the electric vehicle to the second node.

In one embodiment, the second obtaining unit 320 is further configured to: obtain a time T1 when receiving the charging request from the electric vehicle; at a time $T1+t_d^\lambda$, judge whether a number of electric vehicles in each charging station is less than a number of charging posts in each charging station; if yes, the third time period is 0; and if no, obtain the third time period according to formula (2), $$t_{wait}^\lambda = \max\left(0, T^{T1+t_d^\lambda}_{k_{T1+t_d^\lambda}^\lambda - m_c^{T1+t_d^\lambda}+1} - (T_1 + t_d^\lambda)\right) \quad (2)$$

where $t_{wait}^\lambda$ represents the third time period, c represents the plurality of charging posts, $$k_{T1+t_d^\lambda}^\lambda$$

represents a number of electric vehicles in a charging station $\lambda$ at the time $T_1+t_d^\lambda$, $$m_c^{T1+t_d^\lambda}$$

represents a number of charging posts in the charging station $\lambda$, and $$T^{T1+t_d^\lambda}_{k_{T1+t_d^\lambda}^\lambda - m_c^{T1+t_d^\lambda}+1}$$

represents a charging finish time of an electric vehicle $$k_{T1+t_d^\lambda}^\lambda - m_c^{T1+t_d^\lambda} + 1.$$

Specifically, the second obtaining unit 320 obtains the plurality of charging finish times of all of electric vehicles in the charging station (all of electric vehicles comprises the electric vehicles waiting for charging and the electric vehicles being charged), and then sequences the plurality of charging finish times in chronological order, which are $$T_1^{T1+t_d^\lambda} \ldots T_{k_{T1+t_d^\lambda}^\lambda}^{T1+t_d^\lambda}.$$

If there are $$k_{T1+t_d^\lambda}^\lambda$$

electric vehicles being charged, the electric vehicle finishes waiting after the charging of the electric vehicle $$k_{T1+t_d^\lambda}^\lambda - m_c^{T1+t_d^\lambda} + 1$$

has been finished.

In one embodiment, the fifth obtaining unit 350 is configured to obtain a maximum available charging capacity of a power grid. The fifth obtaining unit 360 is configured to obtain the number of the charging posts in each charging station according to the maximum available charging capacity.

Specifically, the fifth obtaining unit 360 obtains parameters and operating information of the distribution network in the power grid, such as the load forecasting value of each node in the distribution network. The fifth obtaining unit 360 then obtains the maximum available charging capacity to ensure that the power of the transmission line of the distribution network is less than the power rating and the voltage of each node of the distribution network is in the voltage ranges.

In one embodiment, the third obtaining unit 330 is further configured to: obtain a current electrical energy and a consumption of electrical energy per unit distance of the electric vehicle; obtain a remaining electrical energy of the electric vehicle according to formula (3), $$E'_{SOC} = E_{SOC} - E_{ave} \cdot \left( \sum_{\eta=1}^{n_{c2,\lambda}^{j}-1} S_{w_{c2,\lambda}^{j,\eta} w_{c2,\lambda}^{j,\eta+1}} + L \right) \quad (3)$$

where $E'_{soc}$ represents the remaining electrical energy of the electric vehicle, $E_{soc}$ represents the current electrical energy of the electric vehicle, and $E_{ave}$ represents the consumption of electrical energy per unit distance of the electric vehicle; obtain the fourth time period according to formula (4), $$t_c^\lambda = \frac{E_{full} - E'_{SOC}}{P_c^\lambda} \quad (4)$$

where $E_{full}$ represents a battery capacity of the electric vehicle, and $P_c^\lambda$ represents a charging power of each charging post in the charging station.

Specifically, the remaining electrical energy, the current electrical energy, the consumption of electrical energy per unit distance and the battery capacity are the battery information of the electric vehicle.

The selecting module 400 is configured to select a minimum first time period from the plurality of first time periods.

The navigating module 500 is configured to navigate the electric vehicle to a charging station corresponding to the minimum first time period.

With the device for navigating the electric vehicle in charging according to an embodiment of the present disclosure, the charging power of the charging station is maximized while ensuring the safe and stable operation of the power grid; and the navigation route which consumes minimum time is provided to the user of the electric vehicle to shorten the total time for charging the electric vehicle.

According to an embodiment of the present disclosure, a computer readable storage medium is provided. The computer readable storage medium comprises a computer program for executing the method for navigating the electric vehicle in charging described above when running on a computer.

Any process or method described in the flowing diagram or other means may be understood as a module, segment or portion including one or more executable instruction codes of the procedures configured to achieve a certain logic function or process, and the preferred embodiments of the present disclosure include other performances, in which the performance may be achieved in other orders instead of the order shown or discussed, such as in a almost simultaneous way or in an opposite order, which should be appreciated by those having ordinary skills in the art to which embodiments of the present disclosure belong.

The logic and/or procedures indicated in the flowing diagram or described in other means herein, such as a constant sequence table of the executable code for performing a logical function, may be implemented in any computer readable storage medium so as to be adopted by the code execution system, the device or the equipment (such a system based on the computer, a system including a processor or other systems fetching codes from the code execution system, the device and the equipment, and executing the codes) or to be combined with the code execution system, the device or the equipment to be used. With respect to the description of the present invention, "the computer readable storage medium" may include any device including, storing, communicating, propagating or transmitting program so as to be used by the code execution system, the device and the equipment or to be combined with the code execution system, the device or the equipment to be used. The computer readable medium includes specific examples (a non-exhaustive list): the connecting portion (electronic device) having one or more arrangements of wire, the portable computer disc cartridge (a magnetic device), the random access memory (RAM), the read only memory (ROM), the electrically programmable read only memory (EPROMM or the flash memory), the optical fiber device and the compact disk read only memory (CDROM). In addition, the computer readable storage medium even may be papers or other proper medium printed with program, as the papers or the proper medium may be optically scanned, then edited, interpreted or treated in other ways if necessary to obtain the program electronically which may be stored in the computer memory.

It should be understood that, each part of the present invention may be implemented by the hardware, software, firmware or the combination thereof. In the above embodiments of the present invention, the plurality of procedures or methods may be implemented by the software or hardware stored in the computer memory and executed by the proper code execution system. For example, if the plurality of procedures or methods is to be implemented by the hardware, like in another embodiment of the present invention, any one of the following known technologies or the combination thereof may be used, such as discrete logic circuits having logic gates for implementing various logic functions upon an application of one or more data signals, application specific integrated circuits having appropriate logic gates, programmable gate arrays (PGA), field programmable gate arrays (FPGA).

It can be understood by those having the ordinary skills in the related art that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The computer readable storage medium may be, but is not limited to, read-only memories, magnetic disks, or optical disks.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for navigating an electric vehicle in charging, comprising acts of:
   S1, obtaining a navigation area, wherein the navigation area comprises a plurality of charging stations;
   S2, receiving a charging request from an electric vehicle in the navigation area;
   S3, obtaining a plurality of first time periods according to the electric vehicle and the plurality of charging stations, wherein each first time period is a time period during which the electric vehicle spends on arriving to a respective one of the plurality of charging stations, waiting for charging and being charged, and wherein obtaining the plurality of first time periods according to the electric vehicle and the plurality of charging stations comprises:
      S31, obtaining a second time period which the electric vehicle spends on arriving to each charging station;
      S32, obtaining a third time period which the electric vehicle spends on waiting for charging in each charging station;
      S33, obtaining a fourth time period which the electric vehicle spends on being charged in each charging station; and
      S34, obtaining each first time period according to a sum of the second time period, the third time period and the fourth time period;
   S4, selecting a minimum first time period from the plurality of first time periods; and
   S5, navigating the electric vehicle to a charging station corresponding to the minimum first time period.

2. The method according to claim 1, after act S1, further comprising:
   obtaining a plurality of intersections in the navigation area;
   marking the plurality of intersections and the plurality of charging stations in the navigation area as a plurality of nodes in the navigation area; and
   obtaining a node connection matrix N according to the plurality of nodes, wherein $$N = \begin{pmatrix} N_{11} & \ldots & N_{1n} \\ \ldots & N_{wz} & \ldots \\ N_{n1} & \ldots & N_{nn} \end{pmatrix},$$

where n represents a number of the plurality of nodes, and $$N_{wz} = \begin{cases} 2 & \text{when node } w \text{ is identical with node } z \\ 1 & \text{when there are other nodes between node } w \text{ and node } z. \\ 0 & \text{when node } w \text{ is directly connected to node } z \end{cases}$$

3. The method according to claim 1, wherein act S31 comprises:
   obtaining a first node which the electric vehicle currently passes, a second node which the electric vehicle will arrive to, and a distance from the electric vehicle to the second node;
   obtaining a path set from the second node to each charging station according to the node connection matrix, wherein each path in the path set passes each node at most once;
   obtaining the second time period according to formula (1), $$t_d^\lambda = \min_{1 \leq j \leq m_{c2,\lambda}} \left( \sum_{\eta=1}^{n_{c2,\lambda}^j - 1} \frac{S_{w_{c2,\lambda}^{j,\eta} w_{c2,\lambda}^{j,\eta+1}}}{\overline{V}_{w_{c2,\lambda}^{j,\eta} w_{c2,\lambda}^{j,\eta+1}}} \right) + \frac{L}{\overline{V}_{c1c2}} \quad (1)$$

where $t_d^\lambda$ represents the second time period, $\lambda$ represents a charging station, c1 represents the first node, c2 represents the second node, L represents the distance from the electric vehicle to the second $m_{c2,\lambda}$ represents a number of the paths in the path set, $n_{c2,\lambda}^j$ represents a number of the nodes passed by a $j^{th}$ path, $w_{c2,\lambda}^{j,\eta}$ represents an $\eta^{th}$ node passed by the $j^{th}$ path, $w_{c2,\lambda}^{j,\eta+1}$ represents an $\eta+1^{th}$ node passed by the $j^{th}$ path, $$S_{w_{c2,\lambda}^{j,\eta} w_{c2,\lambda}^{j,\eta+1}}$$

represents a distance from the node $w_{c2,\lambda}^{j,\eta}$, to the node $w_{c2,\lambda}^{j,\eta+1}$, $$\overline{V}_{w_{c2,\lambda}^{j,\eta} w_{c2,\lambda}^{j,\eta+1}}$$

represents a first average traffic speed from the node $w_{c2,\lambda}^{j,\eta}$ to the node $w_{c2,\lambda}^{j,\eta+1}$, and $\overline{V}_{c1c2}$ represents a second average traffic speed from the first node to the second node.

4. The method according to claim 3, wherein act S32 comprises:
   obtaining a time T1 when receiving the charging request from the electric vehicle;
   at a time $T1+t_d^\lambda$, judging whether a number of electric vehicles in each charging station is less than a number of charging posts in each charging station;
   if yes, the third time period is 0; and
   if no, obtaining the third time period according to formula (2), $$t_{wait}^\lambda = \max\left(0, T_{k_{T1+t_d^\lambda}^\lambda - m_c}^{T1+t_d^\lambda} - (T_1 + t_d^\lambda)\right) \quad (2)$$

where $t_{wait}^\lambda$ represents the third time period, c represents the plurality of $$k_{T1+t_d^\lambda}^\lambda$$

represents a number of electric vehicles in a charging station $\lambda$ at the time $T_1+t_d^\lambda$, $$m_c^{T1+t_d^\lambda}$$

represents a number of charging posts in the charging station $\lambda$, and $$T_{k_{T1+t_d^\lambda}^\lambda - m_c^{T1+t_d^\lambda}+1}^{T1+t_d^\lambda}$$

represents a charging finish time of an electric vehicle $$k_{T1+t_d^\lambda}^\lambda - m_c^{T1+t_d^\lambda} + 1.$$

5. The method according to claim 4, further comprising:
obtaining a maximum available charging capacity of a power grid; and
obtaining the number of the charging posts in each charging station according to the maximum available charging capacity.

6. The method according to claim 4, wherein act S33 comprises:
obtaining a current electrical energy and a consumption of electrical energy per unit distance of the electric vehicle;
obtaining a remaining electrical energy of the electric vehicle according to formula (3), $$E'_{SOC} = E_{SOC} - E_{ave} \cdot \left( \sum_{\eta=1}^{n_{c2,\lambda}^j - 1} S_{w_{c2,\lambda}^{j,\eta} w_{c2,\lambda}^{j,\eta+1}} + L \right) \quad (3)$$

where $E'_{soc}$ represents the remaining electrical energy of the electric vehicle, $E_{soc}$ represents the current electrical energy of the electric vehicle, and $E_{ave}$ represents the consumption of electrical energy per unit distance of the electric vehicle;
obtaining the fourth time period according to formula (4), $$t_c^\lambda = \frac{E_{full} - E'_{SOC}}{P_c^\lambda} \quad (4)$$

where $E_{full}$ represents a battery capacity of the electric vehicle, and $P_c^\lambda$ represents a charging power of each charging post in the charging station $\lambda$.

7. A device for navigating an electric vehicle in charging, comprising:
a first obtaining module, configured to obtain a navigation area, wherein the navigation area comprises a plurality of charging stations;
a receiving module, configured to receive a charging request from an electric vehicle in the navigation area;
a second obtaining module, configured to obtain a plurality of first time periods according to the electric vehicle and the plurality of charging stations, wherein each first time period is a time period during which the electric vehicle spends on arriving to a respective one of the plurality of charging stations, waiting for charging and being charged, and wherein the second obtaining module comprises:
a first obtaining unit, configured to obtain a second time period which the electric vehicle spends on arriving to each charging station;
a second obtaining unit, configured to obtain a third time period which the electric vehicle spends on waiting for charging in each charging station;
a third obtaining unit, configured to obtain a fourth time period which the electric vehicle spends on being charged in each charging station; and
a fourth obtaining unit, configured to obtain each first time period according to a sum of the second time period, the third time period and the fourth time period;
a selecting module, configured to select a minimum first time period from the plurality of first time periods;
a navigating module, configured to navigate the electric vehicle to a charging station corresponding to the minimum first time period;
a non-transitory computer-readable medium comprising computer-executable instructions stored thereon; and
an instruction execution system, which is configured by the instructions to implement at least one of above modules or units.

8. The device according to claim 7, further comprising:
a third obtaining module, configured to obtain a plurality of intersections in the navigation area;
a marking module, configured to mark the plurality of intersections and the plurality of charging stations in the navigation area as a plurality of nodes in the navigation area; and
a fourth obtaining module, configured to obtain a node connection matrix N according to the plurality of nodes, wherein $$N = \begin{pmatrix} N_{11} & \ldots & N_{1n} \\ \ldots & N_{wz} & \ldots \\ N_{n1} & \ldots & N_{nn} \end{pmatrix},$$

where n represents a number of the plurality of nodes, and $$N_{wz} = \begin{cases} 2 & \text{when mode } w \text{ is identical with node } z \\ 1 & \text{when there are other nodes between node } w \text{ and node } z \\ 0 & \text{when node } w \text{ is directly connected to node } z \end{cases}.$$

9. The device according to claim 7, wherein the first obtaining unit is further configured to:
obtain a first node which the electric vehicle currently passes, a second node which the electric vehicle will arrive to, and a distance from the electric vehicle to the second node;
obtain a path set from the second node to each charging station according to the node connection matrix, wherein each path in the path set passes each node at most once;
obtain the second time period according to formula (1), $$t_d^\lambda = \min_{1 \leq j \leq m_{c2,\lambda}} \left( \sum_{\eta=1}^{n_{c2,\lambda}^j - 1} \frac{S_{w_{c2,\lambda}^{j,\eta} w_{c2,\lambda}^{j,\eta+1}}}{V_{w_{c2,\lambda}^{j,\eta} w_{c2,\lambda}^{j,\eta+1}}} \right) + \frac{L}{V_{c1c2}} \quad (1)$$

where $t_d^\lambda$ represents the second time period, λ represents a charging station, c1 represents the first node, c2 represents the second node, L represents the distance from the electric vehicle to the second node, $m_{c2,\lambda}$ represents a number of the paths in the path set, $n_{c2,\lambda}^j$ represents a number of the nodes passed by a $j^{th}$ path, $w_{c2,\lambda}^{j,\eta}$ represents an $\eta^{th}$ node passed by the $j^{th}$ path, $w_{c2,\lambda}^{j,\eta+1}$ represents an $\eta+1^{th}$ node passed by the $j^{th}$ path, $$S_{w_{c2,\lambda}^{j,\eta} w_{c2,\lambda}^{j,\eta+1}}$$

represents a distance from the node $w_{c2,\lambda}^{j,\eta}$, to the node $w_{c2,\lambda}^{j,\eta+1}$, $$\overline{V}_{w_{c2,\lambda}^{j,\eta} w_{c2,\lambda}^{j,\eta+1}}$$

represents a first average traffic speed from the node $w_{c2,\lambda}^{j,\eta}$ to the node $w_{c2,\lambda}^{j,\eta+1}$, and $\overline{V}_{c1c2}$ represents a second average traffic speed from the first node to the second node.

10. The device according to claim 9, wherein the second obtaining unit is further configured to:
   obtain a time T1 when receiving the charging request from the electric vehicle;
   at a time $T1+t_d^\lambda$, judge whether a number of electric vehicles in each charging station is less than a number of charging posts in each charging station;
   if yes, the third time period is 0; and
   if no, obtain the third time period according to formula (2), $$t_{wait}^\lambda = \max\left(0, T_{k_{T1+t_d^\lambda}^\lambda - m_c^{T1+t_d^\lambda}+1}^{T1+t_d^\lambda} - (T_1 + t_d^\lambda)\right) \quad (2)$$

where $t_{wait}^\lambda$ represents the third time period, c represents the plurality of charging posts, $$k_{T1+t_d^\lambda}^\lambda$$

represents a number of electric vehicles in a charging station λ at the $T_1+t_d^\lambda$, $$m_c^{T1+t_d^\lambda}$$

represents a number of charging posts in the charging station λ, and $$T_{k_{T1+t_d^\lambda}^\lambda - m_c^{T1+t_d^\lambda}+1}^{T1+t_d^\lambda}$$

represents a charging finish time of an electric vehicle $$k_{T1+t_d^\lambda}^\lambda - m_c^{T1+t_d^\lambda}+1.$$

11. The device according to claim 10, wherein the second obtaining module further comprises:
   a fifth obtaining unit, configured to obtain a maximum available charging capacity of a power grid; and
   a sixth obtaining unit, configured to obtain the number of the charging posts in each charging station according to the maximum available charging capacity.

12. The device according to claim 10, wherein the third obtaining unit is further configured to:
   obtain a current electrical energy and a consumption of electrical energy per unit distance of the electric vehicle;
   obtain a remaining electrical energy of the electric vehicle according to formula (3), $$E'_{SOC} = E_{SOC} - E_{ave} \cdot \left(\sum_{\eta=1}^{n_{c2,\lambda}^j - 1} S_{w_{c2,\lambda}^{j,\eta} w_{c2,\lambda}^{j,\eta+1}} + L\right) \quad (3)$$

where $E'_{soc}$ represents the remaining electrical energy of the electric vehicle, $E_{soc}$ represents the current electrical energy of the electric vehicle, and $E_{ave}$ represents the consumption of electrical energy per unit distance of the electric vehicle;
   obtain the fourth time period according to formula (4), $$t_c^\lambda = \frac{E_{full} - E'_{SOC}}{P_c^\lambda} \quad (4)$$

where $E_{full}$ represents a battery capacity of the electric vehicle, and $P_c^\lambda$ represents a charging power of each charging post in the charging station λ.

13. A non-transitory computer readable storage medium, comprising a computer program stored thereon, which when executed by an instruction execution system, configures the system to implement a method for navigating an electric vehicle in charging, the method comprising acts of:
   S1, obtaining a navigation area, wherein the navigation area comprises a plurality of charging stations;
   S2, receiving a charging request from an electric vehicle in the navigation area;
   S3, obtaining a plurality of first time periods according to the electric vehicle and the plurality of charging stations, wherein each first time period is a time period during which the electric vehicle spends on arriving to a respective one of the plurality of charging stations, waiting for charging and being charged, and wherein obtaining a plurality of first time periods according to the electric vehicle and the plurality of charging stations comprises:
      S31, obtaining a second time period which the electric vehicle spends on arriving to each charging station;
      S32, obtaining a third time period which the electric vehicle spends on waiting for charging in each charging station;
      S33, obtaining a fourth time period which the electric vehicle spends on being charged in each charging station; and
      S34, obtaining each first time period according to a sum of the second time period, the third time period and the fourth time period;
   S4, selecting a minimum first time period from the plurality of first time periods; and
   S5, navigating the electric vehicle using a charging station corresponding to the minimum first time period.

* * * * *